UNITED STATES PATENT OFFICE.

CHARLES MILDENBERGER, OF NEW YORK, N. Y.

MAKING COMPRESSED YEAST.

SPECIFICATION forming part of Letters Patent No. 412,968, dated October 15, 1889.

Application filed January 26, 1889. Serial No. 297,667. (No specimens.)

*To all whom it may concern:*

Be it known that I, CHARLES MILDENBERGER, of the city, county, and State of New York, a citizen of the Empire of Germany, have invented certain new and useful Improvements in Processes of Making Compressed Yeast, of which the following is a specification.

This invention relates to an improved process of making compressed yeast from the bitter ale-yeast obtained in ale-breweries; and the invention consists of a process of making compressed yeast by first thoroughly washing the ale-yeast, so as to remove the bitter hop-taste from the same; secondly, fermenting the washed yeast by adding a sweet mash freed from alkalies by neutralization with sulphuric acid; thirdly, mixing the light and heavy yeast obtained from the fermented liquor, and, finally, washing the mixture and removing the surplus moisture by pressure.

In carrying my improved process into practice the yeast obtained in the brewing of ale is first thoroughly washed with water, to which some bicarbonate of soda is added, so as to remove the bitter hop-taste from the same. The yeast is thereby weakened, and has to be revived by fermenting it with a mash which is formed of molasses mixed with water and indicating about 20° Bahling's saccharometer. The alkalies contained in the mash are neutralized by sulphuric acid, and then an equal quantity, by volume, of the washed ale-yeast is mixed with an equal quantity of molasses-mash at a temperature of from 75° to 80° Fahrenheit, whereby a lively fermentation takes place, by which the light yeast particles are carried up to the surface of the mash, while the heavy yeast particles settle at the bottom of the same. The lighter yeast is skimmed off and mixed with the heavier yeast that is obtained after the fermented liquor is drawn off. The mixture is then carefully washed and the surplus moisture removed by pressure. The compressed yeast is then made up into smaller or larger cakes or packages ready for the market.

By the process herein described the ale-yeast of the breweries is readily utilized, and in a short time and at little expense an improved article of compressed yeast, which is entirely freed from the bitter principle of the hop, is produced.

Having thus described my invention, I claim as new and desire to secure by Letters Patent—

The process herein described of making compressed yeast, consisting in washing a quantity of ale-yeast with a bath of a solution of bicarbonate of soda, so as to remove the hop-bitter from the same; second, mixing the washed ale-yeast with a sweet mash, freed from alkalies; next, skimming off the lighter yeast or froth, and then drawing off the liquid from the heavier yeast, mixing the froth or lighter yeast with the heavier yeast, and washing the mixture and subjecting the washed mass to pressure, whereby the moisture is removed and cakes are formed, substantially as described.

In testimony that I claim the foregoing as my invention I have signed my name in presence of two subscribing witnesses.

CHARLES MILDENBERGER.

Witnesses:
PAUL GOEPEL,
CARL KARP.